Patented May 5, 1942

2,282,018

UNITED STATES PATENT OFFICE 2,282,018

MANUFACTURE OF ALKALI METAL SILICATE DETERGENTS

Chester L. Baker, Penn Wynne, Pa., assignor to Philadelphia Quartz Company, Philadelphia, Pa., a corporation of Pennsylvania No Drawing. Application October 31, 1938, Serial No. 238,109

9 Claims. (Cl. 252—135)

This invention relates to manufacture of alkali metal silicate detergents; and it comprises a method of treating anhydrous alkali metal silicates to produce a readily soluble detergent, said method comprising finely pulverizing an anhydrous alkali metal silicate; said silicate usually having a composition corresponding to the general formula $Me_2O(SiO_2)_x$ wherein Me represents an atom of an alkali metal and $x$ may vary from about 0.5 to 2.0; mixing the pulverized silicate with a quickly-soluble, compatible, alkaline detergent compound, such as an alkali metal hydroxide, carbonate, borate or phosphate, sufficient water being present to moisten the mixture and to produce a cementing action, and then treating the moist mixture under conditions producing agglomeration of said silicate particles and the formation of a substantially dust-free aggregate of said particles distributed in and cemented together by a matrix of said detergent compound; the said moist mixture being usually subjected to agitation under conditions producing a granular product containing a substantial proportion of rounded granules of substantially uniform size. My invention also includes the product, usually in granular form, produced by the described process, said product comprising an aggregate of finely-pulverized fragments of an anhydrous alkali metal silicate of the type stated distributed in and cemented together by a matrix of an alkaline detergent compound, said product being stable, free-flowing, dust-free and quickly soluble in water; all as more fully hereinafter set forth and as claimed.

Alkali metal silicates are normally manufactured by fusing a mixture of sand and an alkali metal salt at temperatures sufficiently high to volatilize the acid radical of the salt used. The anhydrous glass thus formed is then cooled and dissolved in water, usually at elevated temperatures and pressures, to yield a solution suitable for commercial use. These solutions have been used to a small extent as detergents, but for the most part they have been first converted into a hydrated solid form which permits handling and shipment with a lesser water content. These hydrated products are readily soluble and are widely used as detergents. But it has long been a desideratum in the art to develop an anhydrous silicate having a rate of solubility sufficiently high to permit its direct use in detergent operations. Many attempts have been made to provide such a silicate. It is obvious, of course, that, if the anhydrous glass produced in the fusion method just described could be used directly as a detergent, a considerable economy would result both in transportation costs and in the cost of manufacture.

The rate of solution in water of anhydrous alkali metal silicates is determined by the ratio of $Na_2O$ to $SiO_2$, by the ambient temperature, the concentration of the solution already attained, the character of the agitation, and the specific surface, that is, the surface area per unit of weight. The problem is still further complicated by the fact that water tends to selectively leach the $Na_2O$ from the surface layers of the anhydrous alkali metal silicate particles leaving a highly siliceous film on the surface which effectively inhibits further solution. For example, a lump of anhydrous silicate of soda having 3.22 parts of $SiO_2$ to each part of $Na_2O$ can be immersed in cold water for months, or even years, without more than superficial effect.

Anhydrous alkali metal silicates, when very finely pulverized, can be dissolved in water at a fairly reasonable rate provided that the ratio of water to solid is small. For many detergent operations, however, this rate of solution is still somewhat too slow, even in the case of those products which contain roughly about one or more molecules of alkali metal oxide for each two molecules of silica, which products have a more rapid rate of solution, than silicates of lower alkali content. These more alkaline products are the ones most generally desired for detergent purposes. A further difficulty in the commercial use of these anhydrous silicates arises from the fact that when such silicates are ground to the desired fineness they are extremely dusty. The dust given off in handling is so irritating to the skin and the nostrils of workmen that for all practical purposes it has heretofore been impossible to utilize such products in commercial detergent operations.

I have discovered that the rate of solution of finely-pulverized, anhydrous alkali metal silicates can be increased and at the same time their objectionable dustiness can be obviated by cementing the pulverulent particles together with certain compatible, highly-soluble, alkaline detergent substances in such fashion that reasonably hard, sizable granules or flakes are obtained which comprise an aggregate of the finely divided silicate particles imbedded in a matrix of the alkaline detergent. Products prepared in this way are substantially dust-free and can be handled with comparative safety and comfort in the same way that the hydrated products now on the market are generally used.

When the new granules of this invention are immersed in water the highly soluble cementing material dissolves quickly and the residual finely divided particles of alkali metal silicate are readily wet out and dissolved by the water. The finely divided particles of silicate, which are distributed in the granules of the novel products of this invention, actually dissolve with somewhat greater rapidity than similar particles which are not imbedded in a matrix of a quickly-soluble alkaline detergent compound. This is especially noticeable when the granules are dissolved without the use of agitation. This is a surprising result since it is obvious that the presence of the alkaline detergent delays the water from reaching the silicate particles. A possible explanation for this increased rate of solution appears to reside in the fact that the silicate particles are held apart by the alkaline detergent until the water has had an opportunity to contact them and, as soon as the alkaline detergent dissolves, the silicate particles tend to drop through the solution causing a slight stirring effect and providing a more intimate contact with the water. A further explanation, which may account for this increase in solubility, is that the alkaline detergent may repress the hydrolysis of the silicate and may thereby prevent the formation of a highly siliceous, insoluble film at the surfaces of the silicate particles. But whatever the true explanation, the fact remains that the rate of solution of the finely-divided, anhydrous silicate particles is increased when embedded in a matrix of a quickly-soluble alkaline detergent compound in accordance with this invention.

I have found that quite a large number of alkaline detergent compounds can be used to produce the required cementing action. The primary requirement is that the detergent, i. e. the cementing agent, be completely and rapidly soluble in water. The cementing agent should be more rapidly soluble than the alkali metal silicate particles. It is also desirable to employ an inert cementing agent, i. e. one that does not enter into chemical reaction with the silicate to form insoluble products. These requirements limit the number of substances which can be used. It is further desirable that the cementing agent have some value in the detergent bath so that for all practical purposes my process is largely limited to the use of compatible alkali metal salts, hydroxides and soaps. For the most part I have used alkali metal hydroxides, carbonates, borates, phosphates and soaps. The sodium compounds are preferred since they have the advantage of being cheap. Products prepared with these compounds are very effective detergents for general industrial cleaning, the hydroxides being preferred for some purposes, the carbonates for others, and the phosphates for still others. In fact, by choosing the correct proportion of these cementing agents to the alkali metal silicates it is possible to produce detergents which give desirable results not available from the use of either of the ingredients alone. My products are particularly useful as scouring materials since the sharp particles of anhydrous silicate do not readily scratch glass.

The anhydrous alkali metal silicates which I use in preparing my detergents will usually contain more than one molecule of alkali metal oxide for each two molecules of $SiO_2$ for the reason that solubility is enhanced by an increasing alkali content, and because the alkali is needed in most detergent operations. On the other hand, the alkali metal silicates which I use will usually not contain more than two molecules of alkali metal oxide for one molecule of silica. These limitations can be expressed by the formula $Me_2O(SiO_2)_x$ wherein Me represents an alkali metal atom and $x$ may vary between the limits of about 0.5 to 2.0. The usual commercial alkali metal silicates which are prepared by fusion in a furnace fall between the limits of $x$ equals 1.5 and 4. For commercial purposes the sodium silicates will almost always be used, and I prefer as a rule to use an anhydrous sodium silicate in which $x$ has a value of about 1.

It is important that the alkali metal silicate used be finely ground or pulverized. I have made satisfactory products from anhydrous sodium metasilicate ground sufficiently fine to pass a 65 mesh sieve, although for most purposes I prefer to grind the silicate so that it passes at least a 100 mesh sieve, and preferably a sieve having 150 meshes to the inch. The best range of particle size for anhydrous silicates corresponds to a screen size of about 50 to 200 meshes per inch.

In general the process of this invention is carried out by mixing the finely ground silicate with the cementing agent which has also been reduced to a powdered, flaked or granular condition. The amount of the cementing agent will usually be at least 10 per cent by weight of the total mixture, and may in some cases comprise as much as 75 per cent of the total mixture or more. Ordinarily, from 10 to 20 per cent of the cementing agent is required to effect agglomeration into a dust free granular product, and any excess used over this amount is required, if at all because of its specific contribution to the detergent operation in which the product is to be used. For example, in the washing of milk bottles or in the cleaning of steel it is important to have present in the solution a large amount of sodium hydroxide and for these purposes I would use, in some cases, as high as 80 per cent sodium hydroxide in the detergent mixture.

In one way of manufacturing my new products I first thoroughly mix the dry ingredients. A small amount of water is then added so that the mass is reduced to a moist, crumbly texture. This water is usually added while the mass is being agitated and this agitation is continued, usually with heating, at a moderately low temperature until the batch is formed into particles or granules of more or less spherical shape and these particles are hardened. If desired the mixture of anhydrous silicate and detergent compound can be moistened and allowed to harden en mass, without agitation, after which the hardened mass can be broken into granular form. It is also possible to shape the moistened mass into various forms, such as vermicules by extrusion, pellets by pressing, flakes, etc. followed by hardening the shaped particles. In those cases where the cementing agent forms a hydrate at ordinary temperatures, it is usually not necessary to employ heating in the process to effect removal of the water, since the excess liquid water is eliminated upon hydration. In some cases, it is necessary to effect cooling of the batch in order that the cementing agent will be hardened or crystallized as the desired hydrate. In any case, after the addition of water and the formation of a moist mass of crumbly consistency, the temperature of the mass is then controlled in such fashion that hardening of the mass takes place, that is, the mass is heated or cooled in order to produce hardening. And the mass is advantageously agitated continuously while hardening in order to produce granulation.

In a preferred modification the product of my invention is obtained in the form of substantially spherical granules having a more or less uniform size. This can usually be accomplished merely by passing a slightly moist mixture of anhydrous silicate and detergent through a rotary drier in which the particles are subjected to a rolling action. For example, if a mixture of pulverized silicate of soda and soda ash is mixed with sufficient water to produce a crumbly consistency and if this mixture is placed in a slowly rotating container, it will be quickly converted into a mass of rounded pellets. These pellets will harden upon drying and will retain their spherical shape. The size of the pellets and their uniformity in shape and size is determined largely by the mechanical treatment given the mixture during drying and/or hardening. By suitably controlling the rate of rotation and temperature of the drier it is possible to obtain a product whose particles are of fairly uniform size. For example it is possible to obtain a product in the form of substantially spherical granules about 60 to 80 per cent of which would be retained between a 4 mesh and a 10 mesh screen. The water can be added to the mixture of silicate and detergent in various ways and before or after heating has been started. If the mixture has been heated before the water is added, it is sometimes advantageous to add the water dropwise, by spraying it on the mixture, for example. When a mixture of caustic soda and silicate is heated in a rotary drier to temperatures above 200° C., for example, before the addition of water, it is important to employ a dropwise addition of water since otherwise it is difficult to obtain spherical granules. When water is sprayed on a heated mixture in this manner the drops appear to quickly dissolve the particles of caustic soda without losing their spherical shape and these spheres of dissolved detergent then entrap and pick up particles of the anhydrous silicate until the resultant surfaces become substantially dry, this occurring again without the loss of the original spherical form.

It will be evident to those skilled in the art that this process can be conducted in a great variety of ways. For example, it is possible to employ as a cementing agent a hydrated compound which melts when heated and resolidifies on cooling, in which case no water need be added. The cementing agent may be added to the mixture in molten or dissolved form, etc. The scope of this invention broadly includes various methods of agglomerating the moist mixture of finely-divided particles of an anhydrous alkali metal silicate and a quickly-soluble alkaline detergent, serving as a cementing agent for the silicate particles, to produce a product of the nature described.

The following specific examples illustrate certain processes within the scope of my invention with which favorable results have been obtained in actual practice in the production of my detergent products. The nature and principles of my invention are clearly illustrated by these examples.

Example 1

305 pounds of anhydrous sodium metasilicate, prepared by fusing soda ash and sand and subsequently grinding to pass a 100 mesh sieve, were charged into a graining kettle, together with 50 pounds of flake caustic soda. When these materials had become intimately mixed by stirring, 28 pounds of water were slowly added to the batch. At this stage the batch appeared to be dry but was slightly moist in consistency. Steam was turned into the jacket of the pan and the temperature of the batch was raised to 90° C. At this point the batch was rather moist in appearance and crumbly in texture, but not sticky. The steam was then turned off and cold water allowed to flow through the jacket. After one hour the batch had been reduced to a loose, free-flowing, granular condition, practically dry in texture, and only a small amount of dust which was readily removed by screening. This product was found to dissolve rapidly in water. It was found highly satisfactory as a soap builder in laundry washing.

Example 2

610 pounds of the same pulverized anhydrous sodium metasilicate product as that used in the above example were mixed with 400 pounds of flake caustic soda. 180 pounds of water were then added and stirred in, thereupon the batch assumed a cream-like consistency. This mixture was then chilled on a flaking roll such as is normally used for preparing flake caustic soda, yielding a product in the form of thin white brittle flakes which were completely free from dust and which dissolved readily in water. This product was found to be especially effective in the cleaning of steel sheets prior to electroplating and enameling.

Example 3

61 parts of the same pulverized anhydrous sodium metasilicate product as that used in the above examples were mixed with 40 parts by weight of flake caustic soda. This mixture was heated in an evaporating pan over an open flame to a temperature somewhat above 200° C. under conditions of agitation. At this temperature a small amount of water was added drop-wise to the mixture while continuing agitation. As the drops of water fell into the batch they quickly dissolved some of the caustic soda, forming small moist globules which quickly dried to hard, dense, particles of approximately spherical shape having a diameter ranging from about 1/10 to 1 inch. The entire batch was thus quickly reduced to a granular, dust-free product of substantially spherical pellets.

Example 4

300 pounds of finely pulverized anhydrous sodium metasilicate, prepared by fusion of sand with soda ash and subsequent grinding, were mixed with 530 pounds of commercial soda ash and heated to 75° C. 220 pounds of water were then added, this producing a moist, crumbly texture in the batch. At this stage the material was fed into a rotary, cylindrical drier. In the upper portion of this machine the batch was converted to a mass of small granules. As drying proceeded these granules became hard and dry. The product as discharged from the drier was granular in texture and contained only a small quantity of dust which was removed by screening.

Example 5

30 parts of the same finely ground anhydrous sodium metasilicate were mixed with 30 parts by weight of commercial tri-sodium phosphate. This mixture was agitated and heated to 75° C. in a graining kettle. 5 parts of water were then stirred in, this yielding a moist mass of crumbly consistency. This batch was then placed in a rotary cylinder and rotated until the material had been reduced to a mass of fairly uniformly sized granules. These were then dried to a fairly hard, dust-free condition by heating at 70° C. In this case care was taken not to exceed a temperature of 77° C. which is the melting point of the tri-sodium phosphate. If a more anhydrous product is desired such a batch can be heated to a temperature above 100° C. and then agglomerated as in Example 4.

While I have described what I consider to be the best embodiments of my invention it will be immediately obvious to those skilled in the art that various modifications can be made in the specific procedures set out without departing from the purview of this invention. The particle size of the detergent compound used in my process should be sufficiently fine to dissolve quickly, corresponding substantially to a screen size of about 1 to 10 mesh per inch when in granular form. When the detergent compound is employed in flaked form it is possible to employ flakes having a largest dimension ranging from about 1/10 to 3 inches. My invention is not limited to the use of anhydrous alkali metal silicates having less than 2 molecules of $SiO_2$ to 1 molecule of $Na_2O$ since it is possible to produce products within this invention having up to about 3.25 molecules of $SiO_2$ to 1 molecule of alkali metal oxide. These highly siliceous products, however, dissolve more slowly and are not generally as suited for detergent purposes. The particles of the detergent compound should be more quickly soluble than the particles of alkali metal silicate in order to produce the desired result. The water employed in my process may be added as water of crystallization in the detergent compound and it may be added to the mixture of alkali metal silicate and detergent compound while the mixture is being heated or before or after a heating step. The water may be hot or cold. In the case of the less soluble detergent compounds it is desirable to have either the water or the mixture heated at the time the water is added. For best results the quantity of water present in my process should amount to about 5 to 25 per cent of the weight of the mixture of silicate and alkaline detergent compound. The quantity of water to be added depends to some extent upon the proportion of detergent present in the mixture and the viscosity of the resulting solution of the detergent. In any specific instance it is desirable that, after the addition of water, at least about 10 per cent of the total batch exist in liquid form. In some cases this would require that all of the cementing agent be dissolved while in other cases only a small percentage need be dissolved, depending upon the quantity of detergent present. In general it may be said that the greater the proportion of detergent which is dissolved, the greater the homogeneity of the resulting product. In the final product the silicate remains in substantially anhydrous form while the detergent compound is often hydrated. The silicate remains substantially undissolved during the process. It is obvious, of course, that the present process is applicable to all solid, anhydrous, alkali metal silicates and to all products which can be classified as alkaline detergent compounds which produce a cementing action upon drying. Other modifications of my invention which fall within the scope of the following claims will be immediately evident to those skilled in this art.

What I claim is:

1. In the manufacture of alkali metal silicate detergents from anhydrous silicates, the process which comprises finely pulverizing an anhydrous alkali metal silicate, mixing therewith from about 10 to 75 per cent by weight of a finely-divided, solid, compatible alkaline detergent compound having a cementing action on the silicate particles and a rate of solution in water greater than that of said anhydrous silicate, gently agitating said mixture without the production of any substantial grinding or disintegrating action in the presence of a small amount of water sufficient to produce a moist, crumbly consistency but without any substantial solution or hydration of said anhydrous silicate, whereby composite granules of said mixture are formed, and continuing said agitation at drying and hardening temperatures until the moist mass is converted into substantially dry, dust-free granules comprising an aggregate of said anhydrous silicate particles embedded in a matrix of said alkali metal compound.

2. The process of claim 1 wherein the said anhydrous alkali metal silicate is a compound represented by the general formula $Me_2O(SiO_2)_x$ wherein Me represents an atom of an alkali metal and $x$ may vary from about 0.5 to 2.0.

3. The process of claim 1 wherein the drying and hardening step is conducted at elevated temperatures sufficient to cause the evaporation of water.

4. The process of claim 1 wherein the alkaline detergent compound is one forming at least one crystalline hydrate and the drying and hardening step is conducted at a temperature below the melting point of said hydrate.

5. The process of claim 1 wherein the said anhydrous silicate particles are sufficiently fine to pass a screen ranging in size from about 50 to 200 mesh per inch.

6. The process of claim 1 wherein the water present amounts to about 5 to 25 per cent by weight of the mixture of silicate and alkali metal compound.

7. In the manufacture of alkali metal silicate detergents from anhydrous silicates, the process which comprises finely pulverizing an anhydrous alkali metal silicate, mixing therewith from about 10 to 75 per cent by weight of a finely-divided, compatible alkaline detergent compound having a cementing action on the silicate particles and a rate of solution in water greater than that of said anhydrous silicate, said mixing being conducted in the presence of a small amount of water but without any substantial solution or hydration of said anhydrous silicate, forming the moist mixture into shaped particles and hardening these particles by elimination of excess liquid water; said shaped particles comprising an aggregate of finely pulverized anhydrous alkali metal silicate fragments embedded in a matrix of said alkali metal compound.

8. As a new product, an alkali metal silicate detergent comprising an aggregate composed of finely-pulverized fragmented particles of an anhydrous alkali metal silicate sufficiently fine to pass a screen ranging in size from about 50 to 200 meshes per inch distributed in and cemented together by a matrix comprising a compatible alkaline detergent compound having a rate of solution in water greater than that of said alkali metal silicate; said product being stable, free-flowing, dust-free and readily soluble in water with a rate of solubility greater than that of said fragmented particles in the absence of said matrix.

9. The product of claim 8 wherein said anhydrous silicate is represented by the general formula $Me_2O(SiO_2)_x$ wherein Me represents an atom of an alkali metal and $x$ may vary from about 0.5 to 2.0.

CHESTER L. BAKER.